United States Patent [19]

Broockman et al.

[11] Patent Number: 4,591,236

[45] Date of Patent: May 27, 1986

[54] OPTICAL SCANNER WITH BEAM DIRECTING HOLOGRAMS AT WINDOW

[75] Inventors: Eric C. Broockman; Robert S. Fortenberry, both of Raleigh, N.C.

[73] Assignee: International Business Machines Corporation, Armonk, N.Y.

[21] Appl. No.: 579,633

[22] Filed: Feb. 13, 1984

[51] Int. Cl.⁴ .............................................. G02B 27/17
[52] U.S. Cl. .................................. 350/3.71; 350/3.7; 350/162.17; 350/164; 235/457
[58] Field of Search ............... 235/454, 455, 457, 462, 235/463, 464, 465, 466, 467, 470; 350/3.7, 3.71, 3.72, 162.17, 162.2, 162.24, 163, 164; 355/8

[56] References Cited

U.S. PATENT DOCUMENTS 3,773,401  11/1973  Douklias et al. .................. 350/3.71
4,235,504  11/1980  Ikeda et al. ....................... 350/3.71
4,415,224  11/1983  Dickson .......................... 350/3.71

FOREIGN PATENT DOCUMENTS 55-41479  3/1980  Japan ........................... 350/3.71

Primary Examiner—John K. Corbin
Assistant Examiner—William Propp
Attorney, Agent, or Firm—Gerald R. Woods

[57] ABSTRACT

An optical scanner is improved by securing beam directing holograpic films to the transparent scanner window. The films alter the paths of beams at the window to provide scanning beams suitable for rear or side scanning of label-carrying products. A vertical scanning beam, which sweeps a path parallel to the window's leading edge, might be used to detect the approach of a product to be scanned.

14 Claims, 5 Drawing Figures

OPTICAL SCANNER WITH BEAM DIRECTING HOLOGRAMS AT WINDOW

BACKGROUND OF THE INVENTION

The present invention relates to optical scanners and more particularly to optical scanners with beam directing holograms at the scanner window for redirecting impinging light beams as those beams leave the scanner enclosure through the window.

Fixed head optical scanners are commonly used with processor controlled point of sale systems in retail stores and supermarkets to identify products being processed. With such scanners, a label-carrying product is moved across a transparent scanner window which is normally in the top surface of a stationary scanner enclosure. The scanner enclosure may, for example, be built into a checkout stand in a supermarket. An optical system within the scanner deflects a laser beam to produce one or more scan lines which sweep through a region above the scanner window. Light reflected from the product is detected. Using an electrical signal proportional to the reflected light, potential label candidates are selected and decoded by electronic circuits or microprocessors within the scanner enclosure.

A scanner should be able to detect and successfully decode almost all labels on the first pass of each labeled product over the scanner window. If a label cannot be detected and successfully decoded on the first pass, the product must be moved across the scanner window one or more times. The additional passes or re-scans are obviously time consuming and thus harmful to productivity.

To make an operator as productive as possible, few constraints should be placed on the way a product is held as that product is moved across the scanner window. This means, of course, that the label on the product must be considered as being randomly oriented relative to the scanner. To increase the chances that a randomly oriented label will be properly scanned during a single pass, multi-line scan patterns are used in which the lines intersect each other at angles. The scan patterns are generated by directing a laser beam at a rotating mirror wheel or through a rotating holographic disc to cause the laser beam to be deflected along scan lines. Fixed arrangements of mirrors are used to change the beam paths before the beam leaves the enclosure through the scanner window. Known scan patterns include non-parallel or intersecting lines and-/or parallel lines displaced in space from one another.

Scan patterns have been developed which are quite effective in reading bar coded labels on leading surfaces or bottom surfaces of products being scanned. If the labels are on side surfaces or trailing surfaces, however, the same scan patterns are not as effective since the scanning beams generated by conventional scanners are generally directed toward the approach end of the scanner enclosure. In fact, many scanners are incapable of reading a label appearing on a trailing or side surface of a product as it passes over the scanner window.

While it may be possible to achieve side scanning or rear scanning lines through the use of additional beam folding mirrors within the scanner enclosure, this is not a desirable solution to the problem. Designing, assembling and aligning such mirrors is relatively costly. Moreover, space within the enclosure is limited, making it difficult to position and mount such mirrors without encroaching on space required for other components of the scanner.

SUMMARY OF THE INVENTION

The present invention is an improvement which allows side scanning or rear scanning lines to be produced in an optical scanner without the need for additional fixed mirrors within the scanner enclosure.

The invention is used in the type of optical scanner apparatus which has an enclosure, a coherent light source located within the enclosure, a transparent window in one wall of the enclosure and means for deflecting a light beam generated by the source along scan lines which traverse the transparent window. Light directing means are placed contiguous to the transparent window for redirecting a light beam impinging on the window along a predetermined ray as the beam passes through the window.

In a preferred embodiment, the light directing means comprise optically generated diffraction gratings or holograms which are secured to the bottom surface of the window along one or more edges.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

FIG. 5 is a plan view of the scanner window, showing the placement of the holograms and the tracks of the beams which are redirected by the holograms.

TECHNICAL DESCRIPTION

Figure 1:
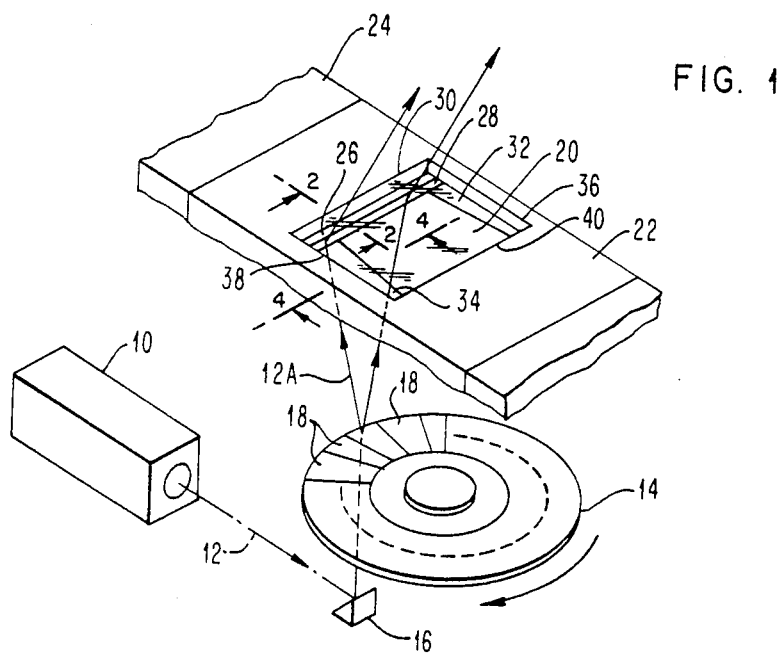
FIG. 1 is a simplified, perspective view of a fixed head scanner incorporating the present invention.

Referring to the drawings and more particularly to FIG. 1, a known type of optical scanner uses a laser 10 to generate a collimated light beam 12 which is directed through a rotating holographic disc 14 via one or more interposed mirrors, such as mirror 16. The holographic disc 14 includes a plurality of holographic facets or optically generated diffraction gratings 18 which deflect an impinging laser beam along generally arcuate scan lines. The path followed by the deflected beam is dependent upon the optical characteristics of the particular facet aligned with the beam. The optical characteristics of the facet, in turn, depend upon the relative placement of light beams used to produce that facet. The steps required to produce a holographic facet having particular light diffracting capabilities are well known to those skilled in the art and need not be described here.

A light beam, such as beam 12A, deflected by the holographic disc 14 is normally directed through a set of beam folding mirrors which provide final shaping for the scan pattern which is to be produced. For the sake of simplicity, the beam folding mirrors have been omitted from the drawing and the light beam 12A is shown as if it were aimed directly at a transparent scan window 20 in the top surface of an enclosure 22, which might be incorporated in a checkout stand 24 in a supermarket or retail store.

A conventional, ideal scanner window 20 does not reflect or refract or otherwise alter the paths of impinging light beams, such as beam 12A.

In accordance with the present invention, however, the paths of light beams impinging on the scanner window are intentionally redirected through the use of light directing means contiguous to the scanner window. In a preferred embodiment of the invention, the light directing means would include one or more films of light-transmissive material having light diffracting properties. The preferred form of material would be a photosensitive material used to record a hologram or optically generated diffraction grating. The same material and techniques used to make the rotating holographic disc could be used to make the films which would be secured to the scanner window 20.

Figure 2:
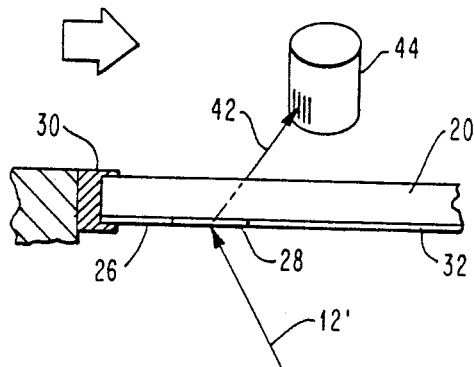
FIG. 2 is a partial cross-sectional view taken along lines 2—2 of FIG. 1 showing the generation of a rear scanning beam in accordance with the invention.

FIG. 1 shows four separate films of holographic material secured to the scanner window. Two films 26 and 28 are mounted next to each other at the leading edge 30 of the window. Two more films 32 and 34 are mounted adjacent side edges 36 and 38, respectively, of the window. In a preferred embodiment, there is no film at the trailing edge 40 of the window. The functions which are performed by each of these films is described in more detail with reference to FIGS. 2 through 5. Referring to FIGS. 2 and 5, holographic films secured to the underside of the scanner window 20 can be used to produce a rear scanning beam 42 capable of detecting a label on a trailing surface 44 of a product as that product passes over the window 20 in the direction indicated by the arrow in FIG. 2. The holographic disc 14 and a limited set of beam folding mirrors are used to generate a scan line which tracks across holographic film 28 along a path defined by dotted line 46. When the beam 12A strikes holographic film 28 at the window, the film redirects the beam along a ray extending generally from the leading edge 30 of the window toward the trailing edge 40.

Figure 3:
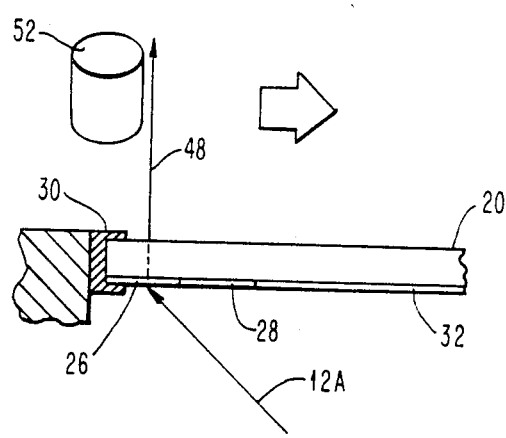
FIG. 3 is a partial cross-sectional view also taken along the lines 2—2 of FIG. 1 but showing the use of the invention to generate a vertical item detecting beam.

Referring to FIGS. 3 and 5, the other holographic film 26 adjacent leading edge 30 is used to redirect beam 12A to provide a vertically oriented beam 48 close to the leading edge 30. Referring to FIG. 5 momentarily, the beam 12A directed at holographic film 26 would follow a path 50 parallel to the leading edge of the window 20. The vertically oriented beam 48 produced by holographic film 26 could serve as an item detecting beam which would sense the entry of an item 52 into the region immediately above the window 20.

Figure 4:
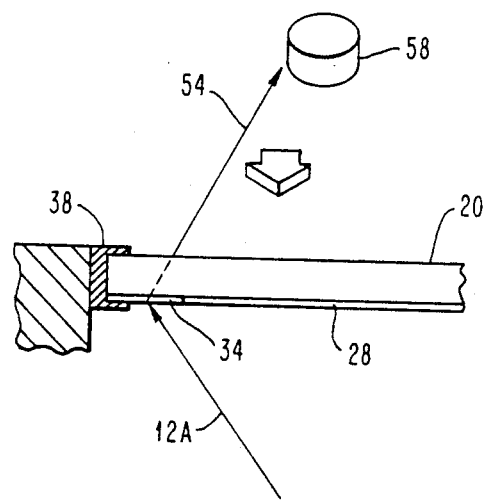
FIG. 4 is a partial cross-sectional view taken along lines 4—4 of FIG. 1 showing the use of the invention to generate a side scanning beam.

Referring to FIGS. 4 and 5, a holographic film 34 secured to the window 20 might also be used to fold the impinging laser beam 12A inwardly or toward the center of the window to provide a much denser scan pattern along the center line of the window. A side scanning beam, such as beam 54 generated when impinging beam 12A follows the track 56 shown in FIG. 5, should improve the readability of labels on the side surface of a product, such as product 58, as it is passed over the window.

Although not shown in the drawings, a mirror image side scanning beam would be generated by deflecting an impinging laser beam along a track 60 in the hologram 32 at the opposite side edge 36 of the window 20.

Holographic films at the scanner window may be used for reasons other than those specifically discussed above. If a holographic film is made to have 50% diffraction efficiency (that is, to redirect half of the impinging light), the film serves the function of generating two scan lines simultaneously in the region above the window. Thus, the number of scan lines in a scan pattern can be effectively doubled with minimal change in scanner cost or complexity. it may be necessary, of course, to use a more powerful laser than is typical in order to achieve a desired level of power for each of the simultaneously generated scan lines.

Another use of holographic films at the scanner window would be to increase the region covered by the scan pattern without increasing the size of the transparent scanner window. The holographic films would redirect impinging beams along paths extending outwardly from the window. This use is significant because the transparent scanner window may be coated with a relatively costly layer of scratch resistant material, such as a sapphire layer. The cost of such a window can be significant. Reducing the size of the window reduces the cost of the scanner.

Further, by placing beam-redirecting holograms at the scanner window, scan patterns of a given complexity can be generated using impinging light beams which are directed along normals to the window, rather than along angles. If the beam is directed along a normal to the window, reflection losses at the window are minimized.

While the use of holographic films at the scanner window is illustrated for achieving functions not readily achievable with conventional beam folding mirrors, such window mounted holograms might also be used to generate conventional, complex scan patterns with fewer or more simply arranged beam folding mirrors then had been previously required. Such use is considered to be within the scope of the invention.

While the specification has described preferred embodiments of the invention and potential uses thereof, variations and modifications will occur to those skilled in the art once they become acquainted with the basic inventive concepts. Therefore, it is intended that the appended claims shall be construed to include both the preferred embodiments and all such variations and modifications as fall within the true spirit and scope of the invention.

We claim:

1. An optical scanner apparatus of the type including an enclosure, a coherent light source located within the enclosure, a transparent window in one wall of the enclosure and means for deflecting a light beam from the source along scan lines traversing the transparent window, the improvement comprising light directing means contiguous to the transparent window for redirecting an impinging light beam along a predetermined ray as it exits from the transparent window.

2. An optical scanner apparatus of the type defined in claim 1 wherein the light directing means is further characterized as at least one light transmissive film having light diffracting properties.

3. An optical scanner apparatus as defined in claim 2 wherein said film is secured to one surface of said transparent window.

4. An optical scanner apparatus as defined in claim 3 wherein said film comprises an optically generated diffraction grating.

5. An optical scanner apparatus as defined in claim 4 further comprising a plurality of light diffracting films, each adapted to diffract an impinging light beam along a different, predetermined ray.

6. An optical scanner apparatus as defined in claim 5 wherein at least one of said films diffracts an impinging light beam along a ray substantially perpendicular to the major surfaces of said transparent window.

7. In an optical scanner apparatus of the type including an enclosure, a coherent light source located within the enclosure, a rectangular transparent window in one wall of the enclosure, said window having a leading edge, a trailing edge and side edges, and means for deflecting a light beam from the source along scan lines traversing the transparent window, the improvement comprising light directing means contiguous to the transparent window for redirecting an impinging light beam along a predetermined ray as it passes through the window.

8. An optical scanner apparatus as defined in claim 7 wherein the light directing means is further characterized as at least one light transmissive film having light diffracting properties.

9. An optical scanner apparatus as defined in claim 8 wherein said film is secured to one surface of said window along the leading edge or one of the side edges thereof.

10. An optical scanner apparatus as defined in claim 9 wherein said film comprises an optically generated diffraction grating.

11. An optical scanner apparatus as defined in claim 10 further comprising a plurality of light diffracting films, each adapted to diffract an impinging light beam along a different, predetermined ray.

12. An optical scanner apparatus as defined in claim 11 wherein at least one of said films diffracts an impinging light beam along a ray substantially perpendicular to the major surfaces of said window as the beam is deflected along a path parallel to the leading edge of said window to thereby produce a scanning beam suitable for detecting an item to be scanned.

13. An optical scanner as defined in either of claims 11 or 12 wherein at least one of said films diffracts an impinging light beam along a ray extending generally from the leading edge toward the trailing edge of said window as the beam is deflected along a path parallel to the leading edge to thereby produce a scanning beam suitable for scanning an item which is approaching the trailing edge of said window.

14. An optical scanner as defined in claim 13 wherein at least one of said films diffracts an impinging light beam along a ray extending generally from a side edge of said window toward the center as the beam is deflected along a path parallel to the side edge to thereby produce a scanning beam suitable for scanning a side surface of an item passing over said window.

* * * * *